(12) United States Patent
Kamiguchi et al.

(10) Patent No.: US 6,562,262 B2
(45) Date of Patent: May 13, 2003

(54) METHOD FOR DETERMINING MOLDING CHARACTERISTIC AND INJECTION MOLDING MACHINE

(75) Inventors: Masao Kamiguchi, Yamanashi (JP); Tatsuhiro Uchiyama, Gotenba (JP); Ikushi Takasaki, Kawasaki (JP); Shusaku Nishiyama, Kawasaki (JP); Katsuya Sakaba, Otsu (JP)

(73) Assignees: Fanuc Ltd., Yamanashi (JP); Fujitsu Limited, Kawasaki (JP)

( * ) Notice: Subject to any disclaimer, the term of this patent is extended or adjusted under 35 U.S.C. 154(b) by 0 days.

(21) Appl. No.: 09/822,469

(22) Filed: Apr. 2, 2001

(65) Prior Publication Data

US 2001/0030375 A1 Oct. 18, 2001

(30) Foreign Application Priority Data

Apr. 3, 2000 (JP) ........................ 2000-100419

(51) Int. Cl.⁷ ............................................. B29C 31/00
(52) U.S. Cl. ................ 264/40.1; 264/40.5; 425/149
(58) Field of Search ............... 264/40.1, 40.5, 264/40.7, 328.13; 425/145, 149

(56) References Cited

U.S. PATENT DOCUMENTS

| | | | |
|---|---|---|---|
| 4,583,931 A | | 4/1986 | Fujita et al. ............... 425/149 |
| 4,889,667 A | * | 12/1989 | Kojima et al. .............. 264/40.1 |
| 5,125,820 A | * | 6/1992 | Iwamoto .................... 264/40.3 |
| 5,611,975 A | * | 3/1997 | Kamiguchi et al. ......... 264/328.1 |

FOREIGN PATENT DOCUMENTS

| | | |
|---|---|---|
| EP | 0744267 | 11/1996 |
| FR | 2686694 | 7/1993 |
| JP | 59071836 | 4/1984 |

OTHER PUBLICATIONS

Churchward et al., Control of Moulding Defects by Melt Flow Front Prediction, Antec, 1993.*

* cited by examiner

*Primary Examiner*—Jill L. Heitbrink
(74) *Attorney, Agent, or Firm*—Staas & Halsey LLP

(57) ABSTRACT

An injection is carried out under a certain molding condition with a nozzle in an injection molding machine left open to sample an injection pressure Pr in every certain cycle for storing. Detected pressure data Pr(0) to Pr(N) for one shot is stored as reference pressure data Pr0(0) to Pr0(N). When defective molding occurs or when a resin lot is changed or the like, the injection is carried out with the nozzle left open under the same molding condition as that used in obtaining the reference pressure data to obtain the detected pressure data Pr(0) to Pr(N). Waveforms of the detected pressure data Pr(0) to Pr(N) and reference pressure data Pr0(0) to Pr0(N) are graphically represented so that variation of the molding condition is observed. It is assumed that if there are any differences, a problem resides in the resin, while if there is no difference but the defective molding occurs, the problem resides in a mold.

28 Claims, 5 Drawing Sheets

METHOD FOR DETERMINING MOLDING CHARACTERISTIC AND INJECTION MOLDING MACHINE

BACKGROUND OF THE INVENTION

1. Field of the Invention

The present invention relates to a method for determining molding characteristic and an injection molding machine which facilitates identifying a problem when a molding trouble occurs during molding by the injection molding machine.

2. Description of the Prior Art

When a trouble such as defective molding occurs during injection molding by an injection molding machine, it is impossible to determine whether the trouble is caused by the molding machine, resin or a mold, which requires examination of its cause one by one. In a case where a problem resides in the molding machine, especially in a check valve, a degree of friction is measured by taking out a screw.

The resins of the same kind have different resin properties between their lots or by differences of drying temperature, time for being left or mixing ratio of regenerant, which requires the examination of the resin properties. Conventionally, the resin properties are examined using a special measuring apparatus.

In the case where neither the molding machine nor the resin has the problem, then the mold is examined for finding the cause of the molding trouble.

As described above, when trouble such as the defective molding occurs, it is impossible to determine whether the trouble is caused by the molding machine, resin or mold, so that the examinations of the cause have to be carried out at random, which takes time to solve the problem.

OBJECTS AND SUMMARY OF THE INVENTION

The present invention has its object to provide a method for determining molding characteristic and an injection molding machine which can determine, when a trouble occurs in the injection molding machine, whether the trouble is caused by a molding machine, resin or a mold.

In order to achieve the above object, the present invention injects resin with a nozzle in an injection molding machine left open to detect an injection pressure produced at that time by a pressure sensor, stores a pressure data detected by the pressure sensor as reference pressure data together with the screw position data or the lapse of time in storing means, and obtains a detected pressure data with respect to the screw position or time when the resin having a different condition such as difference of resin lots, difference of drying temperature, difference of mixing ratio of regenerant or difference of time for being left is injected with the nozzle left open under the same molding condition as that used in an injection with the nozzle left open. Variation of molding characteristic is determined by displaying the detected pressure data and the reference pressure data stored in the storing means on displaying means.

Further, resin is injected with a nozzle left open under each molding condition in compliance with scheduled molding condition to obtain reference pressure data under each molding data to be stored in storing means, and the resin having a different condition is injected with the nozzle left open under a certain or an optional molding condition in obtaining the reference pressure data to obtain detected pressure data and to determine variation of molding characteristic by displaying the reference pressure data having the same molding condition as that used in obtaining the detected pressure data and the detected pressure data on displaying means. If reference pressure data includes no data having the same molding condition, the reference pressure data with respect to the corresponding molding condition is found by interpolating from each reference pressure data stored in the storing means to be displayed.

Moreover, with respect to resin having a different condition, each detected pressure data is obtained under the same scheduled molding condition as in obtaining the reference pressure data to display the detected pressure data and the reference pressure data stored in the storing means correspondingly to the molding condition on the displaying means to determine variation of the molding characteristic.

The molding condition scheduled includes at least conditions of temperatures of a nozzle and a cylinder and a condition of injection speed. Data such as the molding condition in obtaining the data, date, kind of the resin are simultaneously stored when the reference pressure data is detected to be stored.

A controller of the injection molding machine is connected to the personal computer by communication means, the reference pressure data is stored in the storing means provided on the personal computer, and the reference pressure data and detected pressure data are input in the personal computer to be displayed on said displaying means. In this case, data such as a code for identifying the molding machine, the molding condition in obtaining the data, date, kind of the resin are simultaneously stored together with the reference pressure data.

In order to automatically determine the molding characteristic described above, an injection molding machine is provided with a pressure sensor for detecting an injection pressure; storing means for injecting resin with a nozzle in an injection molding machine left open to store a pressure detected by said pressure sensor as reference pressure data together with the screw position data or the lapse of time; and comparing means for outputting an alarm when detected pressure data with respect to the screw position and time obtained by injecting the resin having a different condition with said nozzle left open under the same molding condition as that used in an injection with said nozzle left open exceeds setting monitoring width of said reference pressure data.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
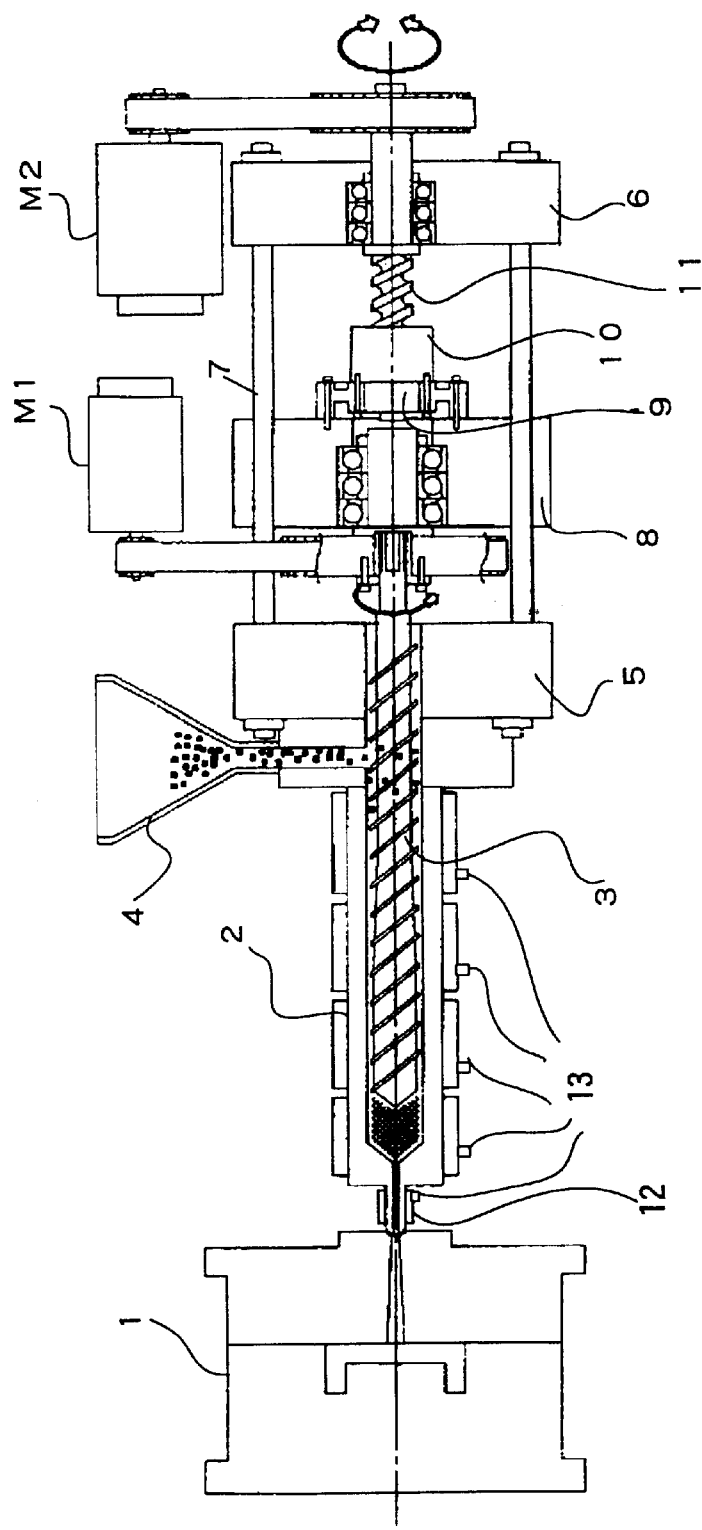
FIG. 1 is a schematic view of an embodiment of an injection molding machine to which a method for determining molding characteristic according to the present invention is applied.

FIG. 1 is a schematic view of an injection mechanism of an injection molding machine using a method for determining molding characteristic according to the present invention.

In this figure, reference numeral 1 denotes a mold; 2, a cylinder; 3, a screw; 4, a hopper for supplying the cylinder with pellets of resin; 5, a front plate which forms the injection mechanism; 6, a rear plate. In addition, a plurality of guide bars 7 is provided between the front plate 5 and the rear plate 6, and a pressure plate 8 guided by the guide bars 7 is arranged movable back and forth (right and left in the figure).

The pressure plate 8 is rotatably mounted with a base of the screw 3. The base of the screw 3 is mounted with a pulley and the screw 3 is rotatably driven by a servomotor M1 for rotating the screw through a driving pulley, a timing belt and the like. The pressure plate 8 is mounted through a pressure sensor (load cell) 9 with a ball nut 10. The ball nut 10 is screwed on a ball screw 11. The ball screw 11 is rotatably driven by a servomotor M2 for injection through the driving pulley, timing belt and a driven pulley.

The cylinder 2 and a nozzle 12 are mounted with a band heater and a temperature sensor 13 for detecting temperatures of the nozzle and heater.

In an injection process, the servomotor M2 for injection is driven to rotate the ball screw 11, to move forward (left in FIG. 1) the nut 10 screwed on the ball screw 11 and the pressure plate 8 and to also move forward the screw 3 to inject melted resin from the cylinder 2 into a cavity of the mold 1. At this time, an injection pressure is detected by the pressure sensor (load cell) 9.

Figure 2:
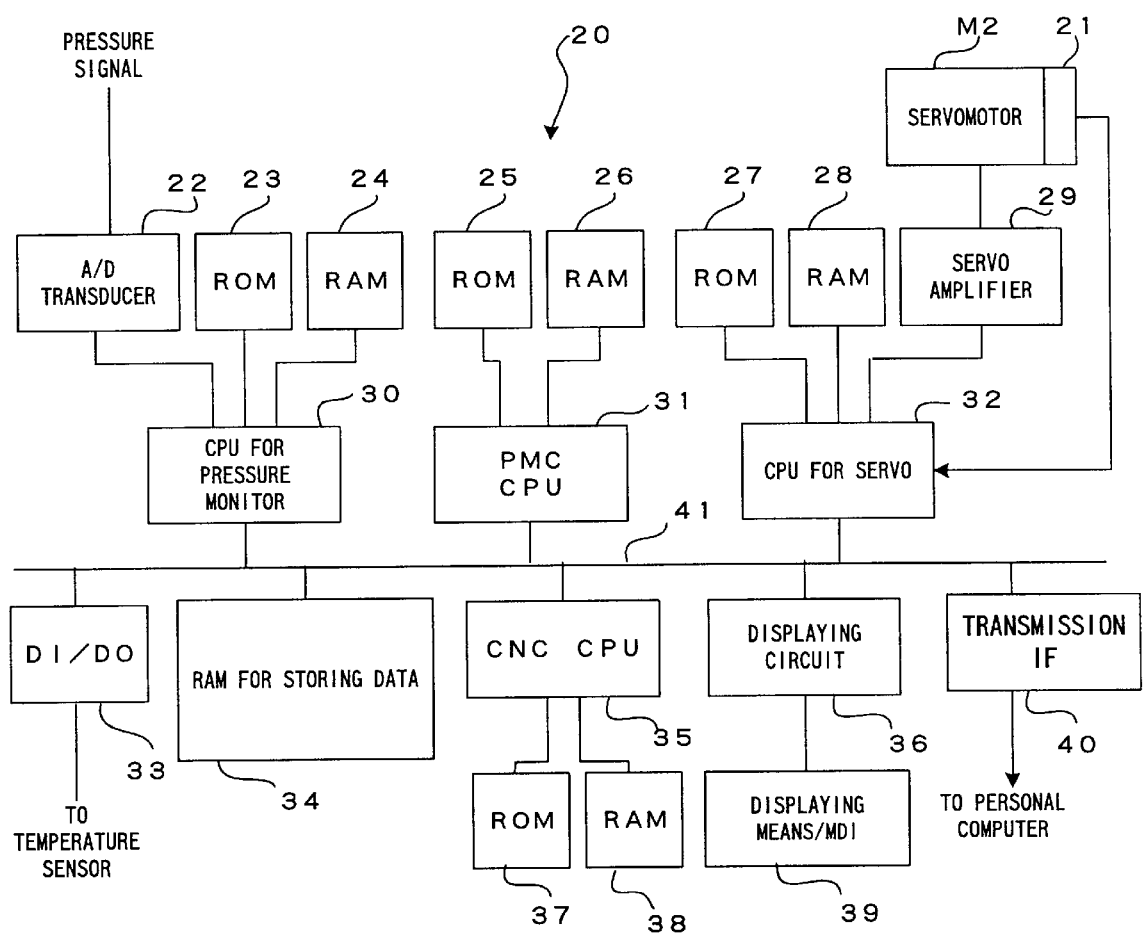
FIG. 2 is a block diagram of a controller according to the embodiment.

FIG. 2 is a block diagram of a controller 20 of this injection molding machine.

The controller 20 has a CPU 35 for CNC which is a microprocessor for controlling numerical values, a CPU 31 for PMC (Programmable Machine Controller) which is a microprocessor for a programmable machine controller, a CPU 32 for servo which is a microprocessor for servo control and a CPU 30 for pressure monitor which samples signals from the pressure sensor 9 through an A/D transducer 22 to be stored in a RAM 24. Information can be transmitted between each microprocessor by selecting mutual input and output through a bus 41.

Connected to the CPU 31 for PMC are a ROM 25 which stores a sequence program or the like for controlling sequence operation of the injection molding machine and a RAM 26 used for temporary storage or the like of calculated data. Connected to the CPU 35 for CNC are a ROM 37 which stores an automatic operation program or the like for totally controlling the injection molding machine and a RAM 38 used for the temporary storage of the calculated data.

Connected to the CPU 32 for servo are a ROM 27 which stores a control program exclusively for the servo control which deals with a position loop, speed loop and current loop and a RAM 28 used for the temporary storage of the data. Connected to the CPU 30 for pressure monitor are a ROM 23 which stores a control program of control effected by the CPU 30 for pressure monitor and the above described RAM 24 which stores the pressure or the like detected by the pressure sensor 9. Further connected to the CPU 32 for servo is a servo amplifier 29 which drives the servomotor of each shaft for such functions as clamping, the injection, the rotation of the screw and an ejector, and output from a position/speed detector mounted on the servomotor of each shaft is fed back to the CPU 32 for servo.

The current position of each shaft is calculated by the CPU 32 for servo on the basis of the feedback signal of position from the position/speed detector 21 and renewable stored in a register for storing the current position of each shaft. FIG. 2 shows, among the shafts, only the servo amplifier 29, the servomotor M2 and position/speed detector 21, which relate to the shaft for the injection, however, the same applies, in their configuration, to the servo amplifiers, servomotors and position/speed detectors which relate to individual shafts for rotation of a screw, mold clamping, and moving of an injection mechanism.

An interface 33 is an input and output interface for receiving signals from the temperature sensor 13, a limit switch and a control panel provided on each part of a body of the injection molding machine and transmitting various commands to peripheral equipment or the like of the injection molding machine.

A manual data input unit 39 with displaying means constituted by CRT or liquid crystal is connected to the bus 41 through a displaying circuit 36, which can carry out selection of graph display screens or function menus and input operation of various data. The manual data input unit 39 is provided with a numeric keypad for inputting data of numerical values and various function keys. Reference numeral 40 denotes a communication interface and the controller of the injection molding machine is connected to a personal computer via the interface 40.

A RAM 34 for storing data constituted by a nonvolatile memory is a memory for storing molding data which stores molding conditions, various setting values, parameter, macro parameter or the like with respect to the injection molding operation. In relation to the present invention, the reference pressure data are stored in the RAM 34 for storing data.

According to the above configuration, the CPU 31 for PMC controls the sequence operation of the whole injection molding machine and the CPU 35 for CNC distributes a movement command to the servomotor of each shaft on the basis of the molding condition stored in an operation program of the ROM 37 or the RAM 34 for storing data. As has conventionally done, the CPU 32 for servo carries out the servo control such as the position loop control, speed loop control and current loop control, namely digital servo processing, on the basis of the movement command distributed to each shaft and the feedback signals of the position and speed detected by the position/speed detector 11 and the like.

The above described configuration is substantially the same as that of a controller of an electric injection molding machine.

In this embodiment, the molding characteristic depending upon the resin to be used is easily determined. In order to achieve it, the pressure data to be referenced is first obtained.

For the molding condition such as injection speed, hold pressure, measuring condition and temperatures of the cylinder and nozzle, a certain condition may be used. The molding condition during a good molded product being obtained may be used. The injection mechanism is moved to separate the nozzle 12 from the mold and to thereby leave the nozzle open. Then a process for obtaining the reference pressure data is started.

Figure 3:
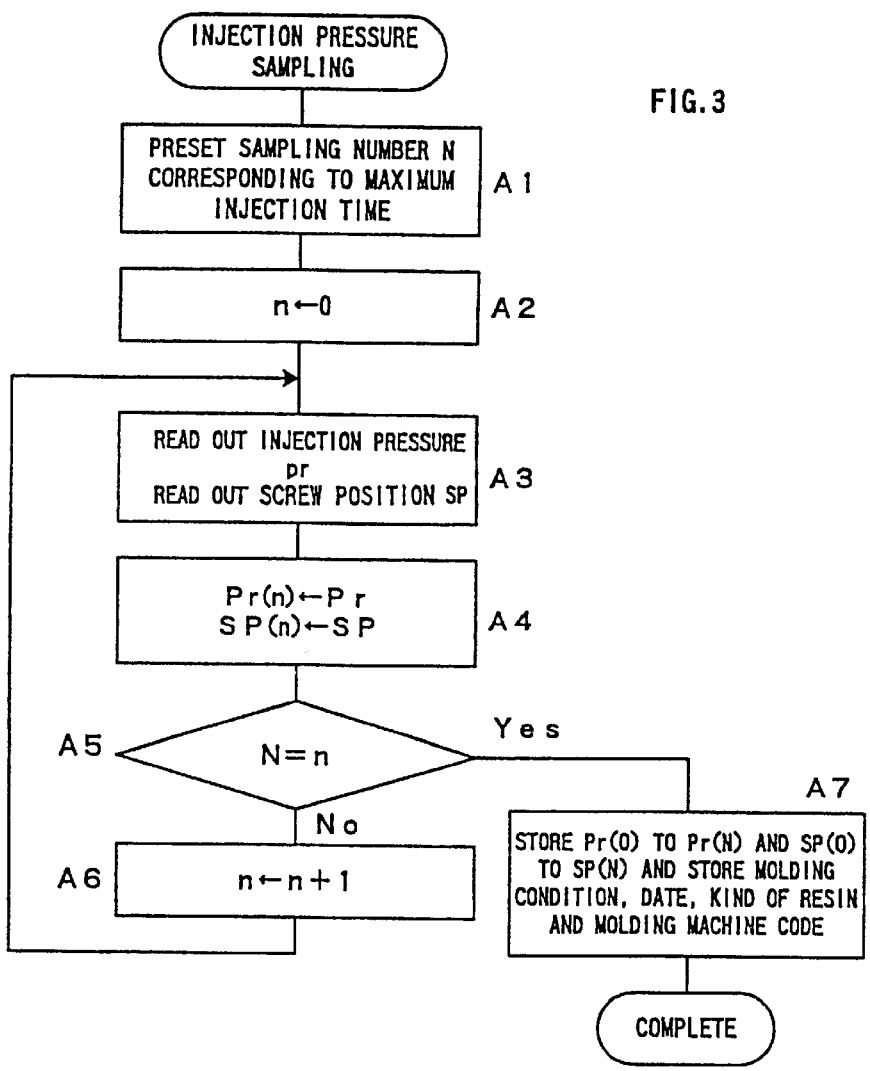
FIG. 3 is a flow chart of a process of obtaining reference pressure data according to the embodiment.

FIG. 3 is a flow chart of the pressure sampling process for obtaining the reference pressure data, carried out by the CPU 30 for pressure monitor.

When the injection is started, sampling number N corresponding to preset maximum injection time is set in the register (step A1). An index n is set to "0" (step A2) to read a current injection pressure Pr detected by the pressure sensor 9 through the A/D transducer 22 and to read screw position data SP from a current position storing register for storing the current screw position (step A3). The read current injection pressure Pr and the screw position data SP are stored in the RAM 24 as Pr(n) and SP(n) (step A4).

Then, it is determined whether the index n reaches the setting sampling number N (step A5) and if not, the index n is subjected to increment by "1" (step A6), returning to the step 3.

Thereafter, the processes from the steps 3 to 6 are carried out in every sampling cycle. When the index n reaches the setting sampling number N, injection pressure data Pr(1) to Pr(N) and screw position data SP(1) to SP(N) stored in the RAM 34 are stored as the reference pressure data Pr0(1) to Pr0(N) and reference position data SP0(1) to SP0(N) in the RAM 34 for storing data constituted by the nonvolatile memory. At this time, a molding machine code is also stored which identifies the molding condition, date, kind of the resin and the injection molding machine (step A7). In this case, the pressure data may be stored as the reference pressure data of a function of position, corresponding to the screw position, however, the reference pressure data corresponding to the screw position is actually obtained by storing the injection pressure data Pr(1) to Pr(N) and the screw position data SP(1) to SP(N) in each sampling.

The reference pressure data and pressure position data may be obtained by a plurality of injections rather than one injection with the nozzle left open. In this case, the processes of steps A1 to A7 are carried out in every injection. In the step A7, the number of injections is counted by a counter and if it does not reach the setting number, the injection pressure data Pr(1) to Pr(N) and the screw position data SP(1) to SP(N) are stored in another memory of the RAM 24 or the RAM 34 for storing data.

When the number reaches the setting injection number, an average of each sampling of the stored injection pressure data Pr(1) to Pr(N) is found and a group of the data consisting of the average values in each sampling is stored as the reference pressure data Pr0(1) to Pr0(N) in the RAM 34 for storing data. Alternatively, the injection pressure data Pr(1) to Pr(N) is stored in the RAM 34 for storing data in the form of the average of the pressure data corresponding to the screw position obtained on the basis of respective screw position data SP(1) to SP(N) as the reference pressure data which is a function of position.

On the other hand, in order to examine the molding characteristic when the molding trouble occurs such as the occurrence of the defective molding form during repeating the molding cycle, or when the resin lot is changed, the nozzle of the injection molding machine described above is left open to carry out the injection under the same molding condition as that used in obtaining the reference pressure data. Then, in the same sampling cycle as in the process shown in FIG. 3, the injection pressure detected by the pressure sensor 9 is obtained in the RAM 24 as the pressure data Pr(1) to Pr(N) and simultaneously the screw position data SP(1) to SP(N) is obtained.

Figure 4:
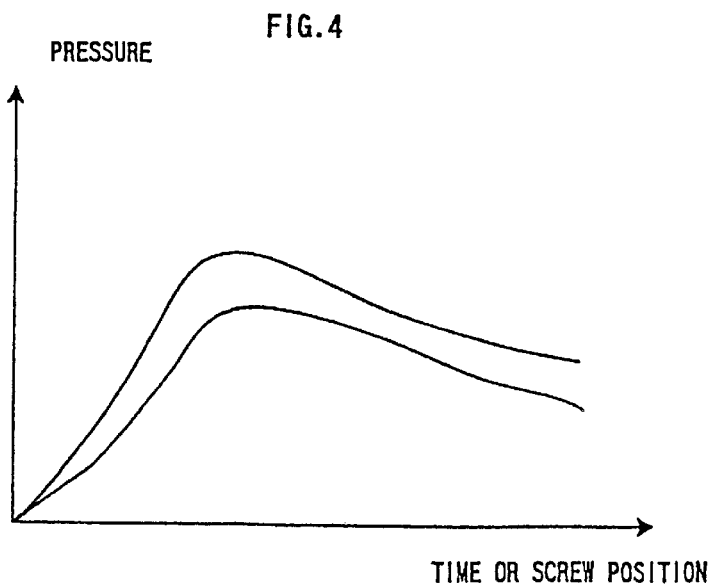
FIG. 4 is an example of a graphic representation of the reference pressure data and detected pressure data for determining the molding characteristic according to the embodiment.

Then, the pressure data Pr(1) to Pr(N) stored in the RAM 24 and the reference pressure data Pr0(1) to Pr0(N) stored in the RAM 34 for storing data are read out and displayed on the display screen of the manual data input unit 39 with displaying means. FIG. 4 is a graphical representation of the above mentioned reference pressure data Pr0(1) to Pr0(N) and detected pressure data Pr(1) to Pr(N). At this time, the molding machine code is also displayed for confirmation which identifies the molding condition, date, kind of the resin and injection molding machine stored together with the reference pressure data.

When compared by the pressure data with respect to the screw position, the pressure data Pr(1) to Pr(N) with respect to the screw position data SP(1) to SP(N) stored in the RAM 24 is displayed and the reference pressure data Pr0(1) to Pr0(N) with respect to the reference position data SP0(1) to SP0(N) stored in the RAM 34 for storing data is displayed to be compared.

When two waveforms displayed on the display screen are substantially the same, it means that neither the resin nor the injection molding machine has problems. However, if the defective molding occurs when molding is carried out using the resin under the molding condition where good molded products were obtained with the resin for which the reference pressure data was obtained, it is determined that a defective mold is the cause. When the waveforms of the reference pressure data Pr0(1) to Pr0(N) and pressure data Pr(1) to Pr(N) are different, it is determined that there is a problem in the resin or the injection part or the like in the injection molding machine.

Even in the case of the same kind of resin, the resin properties vary by various reasons such as the difference in the lots in production of the resin, difference in degree of drying of the resin, difference in storing condition of the resin, difference in lapsed time after the production of the resin and difference in mixing ratio of the regenerant so that molding under the same molding condition cannot always produce the good molded product and that the defective molding may occur.

When the molding machine is aged to have a worn screw or defect in a check valve mounted on a tip of the screw, molding under the same molding condition and by use of the same kind of resin cannot always produce a good molded product. Using another molding machine similarly specified cannot always produce a good molded product in consequence of the difference between the machines.

For this reason, when the molding machine has no problem and the resin properties have no differences, the pressure data Pr(1) to Pr(N) is obtained with the nozzle of the injection molding machine left open under the same molding condition as that used in obtaining the reference pressure data. The pressure data Pr(1) to Pr(N) becomes substantially identical to the reference pressure data Pr0(1) to Pr0(N) so that two display waveforms which display each data becomes substantially identical. However, if the waveforms are not substantially identical, it is determined that the molding characteristic is different and that there is the problem in the resin or the molding machine.

Figure 5:
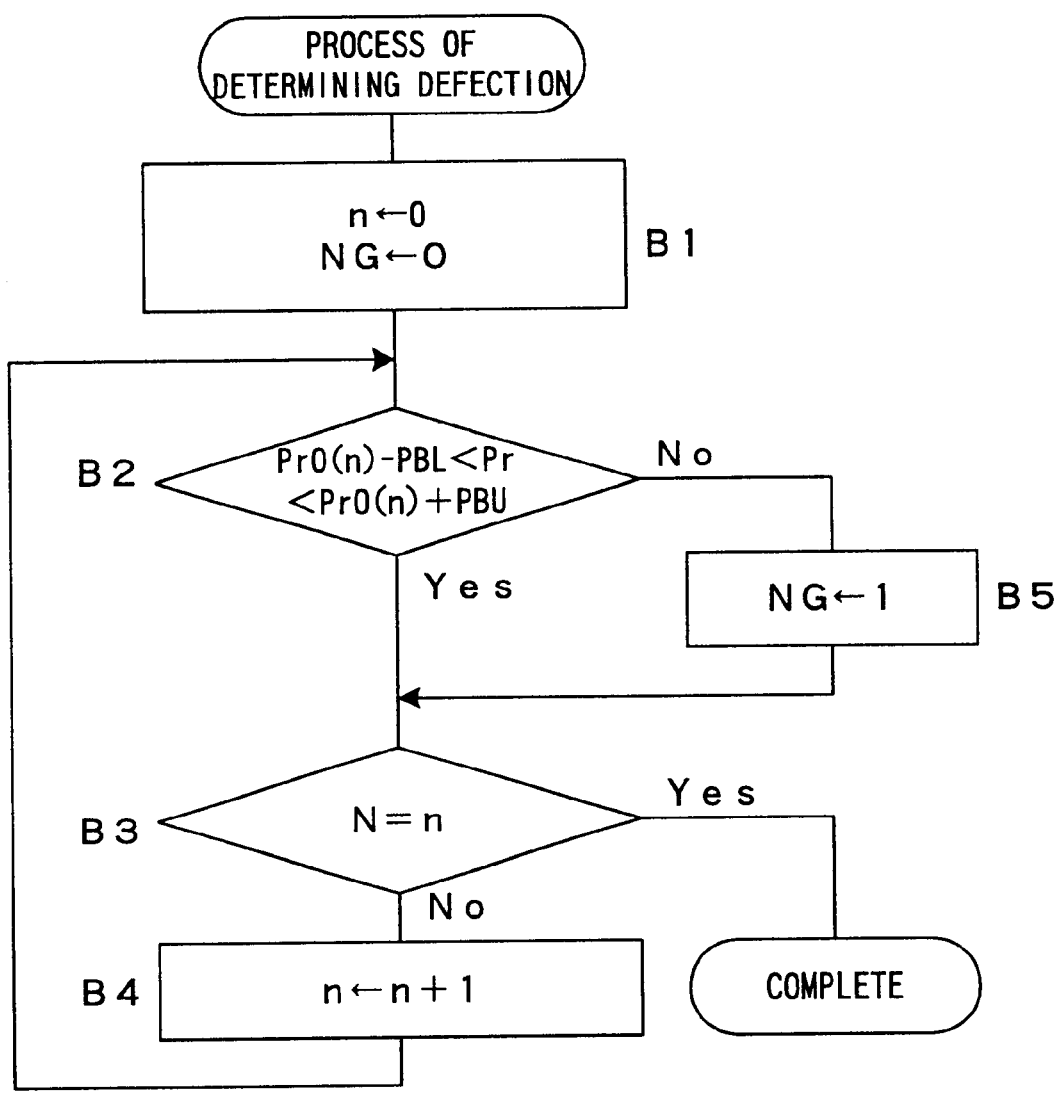
FIG. 5 is a flow chart of a process of determining defective molding characteristic according to the embodiment.

The controller of the injection molding machine may set a monitoring width with respect to the reference pressure data Pr0(1) to Pr0(N) and raise an alarm when the detected pressure data Pr(1) to Pr(N) exceeds the monitoring width. Namely, a lower limit width PBL and an upper limit width are set in advance with respect to the reference pressure data Pr0(1) to Pr0(N) and the injection is started with the nozzle of the injection molding machine left open. At that time, the pressure data is sampled in every sampling cycle to allow the PMC processor 31 to carry out the process of determining defection as shown in FIG. 5.

When the injection is started, the index n and a flag NG are set to "0" (step B1). It is determined whether the current pressure Pr is within the set monitoring width with respect to the reference pressure data Pr0(n) or not by determining whether the value of the current injection pressure Pr read out is higher than the value obtained by subtracting the setting lower width PBL from the reference pressure data Pr0(n) and lower than the value obtained by adding the setting upper width PBU to the reference pressure data Pr0(n)(step B2).

When the current pressure Pr is within the monitoring width, it is determined that whether the index n reaches the setting sampling number N (step B3) and if not, the index n is subjected to increment by "1" (step B4), returning to the step B2 to repeat the processes of the steps B2 to B4 in every sampling cycle.

However, when the detected current pressure Pr is determined not to be in the monitoring width which is set with respect to the reference pressure data Pr0(n) in the step B2, the flag NG is set to "1" (step B5), moving to the step B3. When the flag NG is set to "1" in the step 5, the process may be finished as it is.

When the defection flag NG is set to "1", the alarm is raised by a lamp or warning sound.

In the above example, the process of determining the defection as shown in FIG. 5 is carried out with the current injection pressure being sampled. In addition to this, after a shot is finished and the detected pressure data Pr(1) to Pr(N) of the shot is stored in the RAM 24, the process in FIG. 5 may be carried out to determine the defection. In this case, the only difference from the above example is that the current pressure Pr becomes the detected pressure data Pr(1) to Pr(N) corresponding to the index n.

In the above embodiment, one reference pressure data Pr0(1) to Pr0(N) is obtained under a certain molding condition, and the injection pressure obtained when the injection is carried out with the nozzle left open under the same molding condition as this is compared with the reference pressure data to determine the molding characteristic.

Next, a second embodiment will be described below which can compare the pressure data under a plurality of molding conditions to precisely determine the molding characteristic and also can determine the molding characteristic with respect to optional molding conditions.

Figure 6:
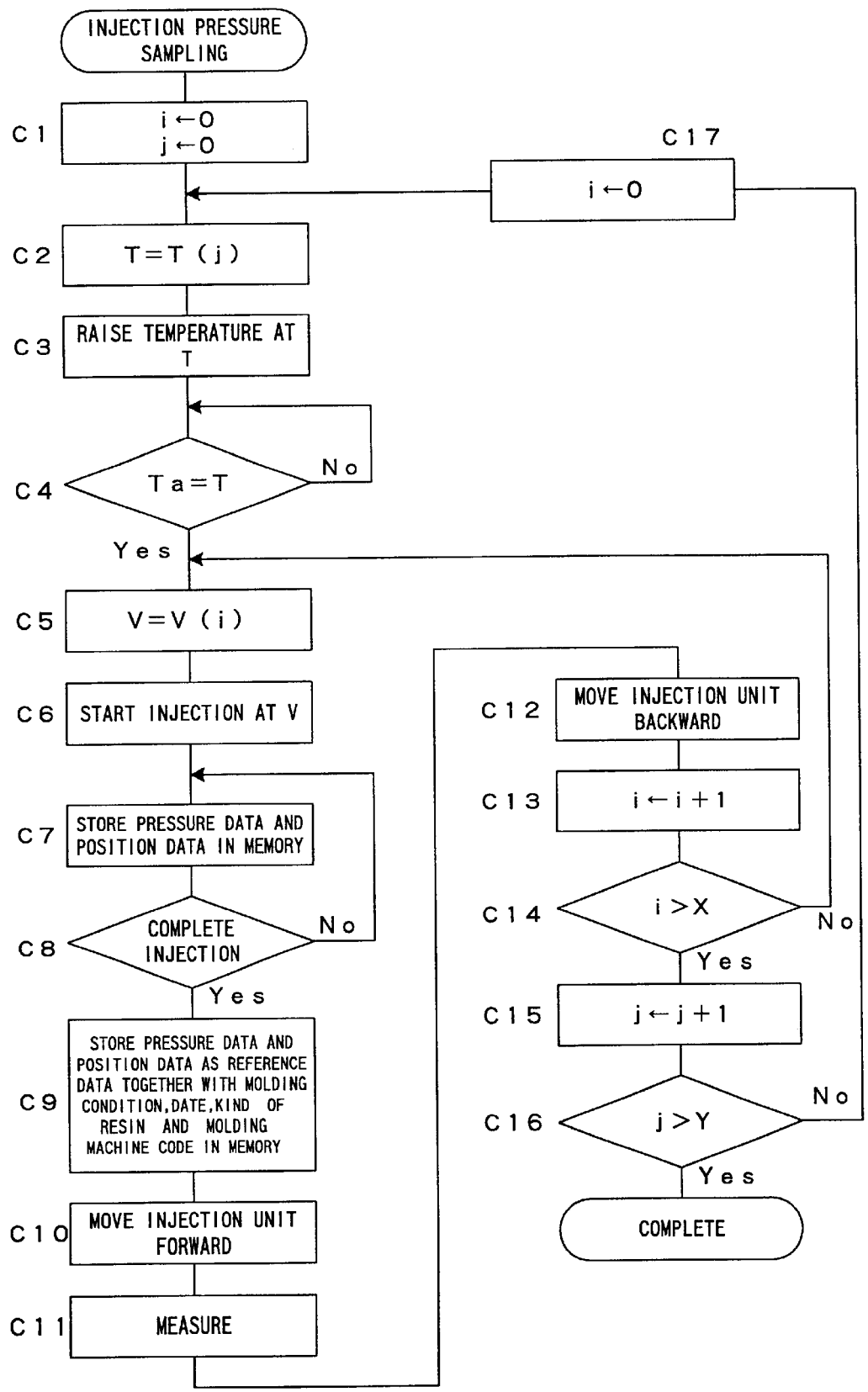
FIG. 6 is a flow chart of a process of obtaining the reference pressure data by changing a molding condition with a schedule according to the embodiment.

FIG. 6 is a flow chart of a process according to the second embodiment where a plurality of molding conditions are scheduled to obtain, under each molding condition, the reference pressure data Pr0(1) to Pr0(N) and the reference position data SP0(1) to SP0(N).

In the second embodiment, at first, a plurality of setting temperatures T(0) to T(Y) and a plurality of setting speeds V(0) to V(X) are set with respect to the cylinder and nozzle and are stored in the RAM 34 for storing data in advance.

When the injection unit for the injection molding machine is moved backward to open the nozzle and to input a command for obtaining the reference pressure data, the CPU 31 for PMC sets the index i and j to "0" (step C1). The set temperature T(1) (T(0) at first) is read out to be set as the setting temperature T in a memory for setting the molding condition in effecting the molding operation. The temperature is started to be raised at the set temperature T (steps C2 and C3).

When the temperature Ta detected from the temperature sensor 13 through the input and output interface 33 reaches the setting temperature T (step C4), the speed V(i) (V(O) at first) is read out to be set as the setting speed V in the memory for setting the molding condition (step C5).

Then, the injection is started at this setting speed V (step C6). Before completion of the injection, as in the same process shown in FIG. 3, the CPU 30 for pressure monitor samples the injection pressure detected by the pressure sensor 9 to be stored in the RAM 24 as the pressure data Pr(1) to Pr(N) and simultaneously the screw position data SP(1) to SP(N) is stored (steps C7 and C8).

After the completion of the injection, the detected pressure data Pr(1) to Pr(N) and the screw position data SP(1) to SP(N) stored in the RAM 24 are stored in the RAM 34 for storing data as the reference pressure data Pr0(1) to Pr0(N) and the reference position data SP0(1) to SP0(N). At this time, the temperature, speed or other molding conditions, date of obtaining the data and kind of the resin are also stored corresponding to the reference pressure data Pr0(1) to Pr0(N) (step C9).

Next, the injection unit is moved forward to abut the nozzle against a flat plate mounted instead of the mold to close an opening of the nozzle. Then, the measuring process is carried out, and after the completion of the measurement, the injection unit is moved backward to leave the nozzle open (steps C10 to C12). The index i is then subjected to increment by "1" (step C13) and it is determined whether the index i exceeds the setting value X (step C14) and if not, returning to the step C5, and the next set speed V(i) is set in the memory for setting the molding condition to carry out the injection at this speed V (=V(i)) (steps C5 and C6), and thereafter, the processes from the steps C7 to C14 are carried out. The processes from the steps C5 to C14 are repeated before the index i exceeds the setting value X to obtain (1+x) reference pressure data and corresponding position data at the setting temperature T(j) (=T(0)) and at respective speed V(o) to V(x).

Hereafter, a data group of the reference pressure data Pro(1) to Pr0(N) obtained under the molding condition of the setting temperature at Tj and setting speed at Vi is referred to as PT(j,i) and a data group of the reference position data SP0(1) to SP0(N) is referred to as PT(j,i).

Next, when the index i is determined to exceed the setting value X in the step C14, the index j is subjected to increment by "1" to determine whether the index j exceeds the setting value Y and if not, the index j is subjected to increment by "1" (steps C15 to C17) to carry out the processes after the step C2. Namely, the setting temperature T(j) shown by the index j is read out to be set in the memory for setting the molding condition and to carry out the injection at this temperature.

In the step C16, the processes of the steps C2 to C17 are repeated before the index j exceeds the setting value Y, and when the index j exceeds the setting value Y, a group of (x+1)x(y+1) reference pressure data PT(0,0) to PT(0,x), PT(1,0) to PT(1,x) . . . PT(y,0) to PT(y,x) and a group of (x+1)x(y+1) reference position data ST(0,0) to ST(0,x), ST(1,0) to ST(1,x) . . . ST(y,0) to ST(y,x), in which molding conditions are changed (temperature and injection speed are changed) on the basis of the schedule, are obtained.

After obtaining and storing the (x+1)x(y+1) groups of reference pressure data PT(j,i) and (x+1)x(y+1) groups of reference position data ST(j,i) in this way, when determining the molding characteristic, any of the (x+1)x(y+1) groups of reference pressure data PT(j,i) are selected to carry out the injection under the same molding condition as that used in obtaining the selected reference pressure data PT(j,i) for determining the molding characteristic.

The molding characteristic is determined by displaying, as a function of time, the selected reference pressure data Pr0(1) to Pr0(N) and the pressure data Pr(1) to Pr(N) detected at that time on the screen of the displaying means as shown in FIG. 4. In the display of the pressure with respect to the screw position, the horizontal line is taken as the position to display the selected reference pressure data Pr0(1) to Pr0(N) and the pressure data Pr(1) to Pr(N) with respect to the reference position data SP0(1) to SP0(N) and the screw position data SP(1) to SP(N).

When the precise molding characteristic is desired to be grasped, the injection is also carried out, with the nozzle left open, for the resin of which molding characteristic is to be grasped in the same schedule as shown in FIG. 6 under the same condition where the reference pressure data was obtained. The pressure data Pr(1) to Pr(N) are respectively obtained and the reference pressure data Pr0(1) to Pr0(N) and the detected pressure data Pr(1) to Pr(N), which were obtained under the same molding condition, are graphically displayed in pairs on the displaying means, thereby the molding characteristic being grasped.

Further, in the case where there is no reference pressure data having the same molding condition as in trying to determine the molding characteristic, the reference pressure data corresponding to the molding condition in trying to determine the molding characteristic is created by interpolating from the reference pressure data already found.

For example, when there is no reference pressure data having the setting temperature at Ta and the injection speed pattern at Va and when the molding characteristic is to be determined under the molding condition of the setting temperature Ta, the injection speed pattern Va and other molding conditions identical to those of the reference pressure data, the reference pressure data is selected which has a relationship of the setting temperature at $Tk<Ta<Tk+1$ and the speed at $Vq<Va<Vq+1$, $Vq'<Va<Vq'+1$ (when compared corresponding to the screw position, the pressure data corresponding to the screw position is taken as each selected reference pressure data, which is obtained on the basis of the reference position data corresponding to the selected reference pressure data). That is, two reference pressure data Pt(Tk, Vq) and Pt(Tk, Vq+1) at set temperature Ta and speed Vq and Vq+1 in the molding condition and two reference pressure data Pt(Tk+1, Vq') and Pt(Tk+1, Vq'+1) at set temperature Tk+1 and speed Vq' and Vq'+1 are selected. With interpolation from those four reference pressure data, the reference pressure data at set temperature Ta and the injection speed pattern Va can be obtained.

The sampling data of the reference pressure data PT(Tk, Vq), PT(Tk,Vq+1), PT(Tk+1,Vq'), PT(Tk+1,Vq'+1) are represented as Pr0k,q (n), Pr0k,q+1(n), Pr0k+1,q'(n), Pr0k+1, q'+1(n), and the sampling data Pr0a,a (n) of the reference pressure data PT(Ta,Va) found by interpolating therefrom are found by the following formula (1). Here, "n" represents values from 1 to N.

$$Pr0a,a(n)=Pa2(n)+(Pa2(n)-Pa1(n))\times(Ta-Tk)/(Tk-Tk+1) \quad (1)$$

wherein $$Pa1(n)=Pr0k,q(n)+(Pr0k,q+1(n)-Pr0k,q(n))\times(Va-Vq)/(Vq+1-Vq)$$

$$Pa2(n)=Pr0k+1,q'(n)+(Pr0k+1,q'+1(n)-Pr0k+1,q'(n))\times(Va-Vq')/(Vq'+1-Vq')$$

In each embodiment described above, the molding characteristic is determined using the displaying means of the controller of the injection molding machine, alternatively, the molding characteristic may be determined using displaying means of a personal computer. In this case, a plurality of injection molding machines can be dealt with by one personal computer.

As described above, the reference pressure data Pr0(1) to Pr0(N) and the reference position data SP0(1) to SP0(N) corresponding thereto obtained are stored in the RAM 34 for storing data in the controller of the injection molding machine in the embodiment described above. These reference pressure data and reference position data are transmitted to a personal computer through the transmitting interface 40 together with the molding machine code for identifying the injection molding machine so that the reference pressure data Pr0(1) to Pr0(N) and the reference position data SP0(1) to SP0(N) are stored in storing means in the personal computer together with the molding machine code.

That is, in the process shown in FIG. 3, the reference pressure data Pr0(1) to Pr0(N) and the reference position data SP0(1) to SP0(N) are transmitted to the personal computer together with the molding condition, date, kind of the resin and molding machine code in the step C7. In the case where the reference pressure data is obtained by the schedule shown in FIG. 6 under the various molding conditions, the reference pressure data Pr0(1) to Pr0(N) and the reference position data SP0(1) to SP0(N) are transmitted to the personal computer together with the molding condition, date, kind of the resin and molding machine code in the step C9 to be stored in the storing means of the personal computer.

When the molding characteristic is determined, the detected pressure data Pr(1) to Pr(N) and the screw position data SP(1) to SP(N) are transmitted from the injection molding machine to the personal computer together with the molding machine code, and the personal computer graphically displays the detected pressure data Pr(1) to Pr(N) transmitted and the reference pressure data Pr0(1)) to Pr0(N) stored in the molding machine code transmitted in pairs on the displaying means. Alternatively, these data are converted to the pressure data with respect to the screw position and are displayed. At this time, the molding condition, date, kind of the resin and molding machine code are also displayed for confirmation.

When a plurality of reference pressure data obtained by scheduling in the process shown in FIG. 6 is stored in the storing means of the personal computer, the reference pressure data which correspond to the molding condition of the detected pressure data (Pr(1) to Pr(N) transmitted are graphically displayed. If no reference pressure data is found which corresponds to the molding condition, the reference pressure data having the corresponding molding condition is calculated by the above described interpolating process and displayed.

The present invention enables detecting the change of the molding characteristic by the injection with the nozzle left open and easily determining whether the change of the molding characteristic is caused by the molding machine, resin or mold.

What is claimed is:

1. A method for determining a molding characteristic of an injection molding machine, comprising the steps of:
   injecting a first resin having certain resin properties with a nozzle left open and detecting an injection pressure produced at that time using a pressure sensor;
   storing pressure data detected by the pressure sensor as reference pressure data, together with screw position data or time lapse data, in a storage device;

injecting a second resin, having at least one different resin property, with the nozzle left open and detecting an injection pressure, using the pressure sensor, as detected pressure data;

displaying the detected pressure data and the stored reference pressure data on a display; and determining a variation of the molding characteristic based on the displayed data.

2. The method for determining a molding characteristic according to claim 1, wherein the second resin has, as the at least one different resin property, at least one of differences of resin lot, drying temperature, mixing ratio of regenerant and age.

3. The method for determining a molding characteristic according to claim 1, wherein additional data including at least one of the molding conditions while obtaining the reference pressure data, date, and a kind of the first resin, is simultaneously stored when the reference pressure data is detected and stored.

4. The method for determining a molding characteristic according to claim 1, wherein the display and the storage devices are associated with a personal computer, a controller of the injection molding machine is connected to the personal computer by a communication means, and said reference pressure data and detected pressure data are input in the personal computer to be displayed on the display.

5. The method for determining a molding characteristic according to claim 4, wherein additional data including at least one of a code for identifying the injection molding machine, molding conditions while obtaining the data, date and a kind of the first resin, are simultaneously stored when the reference pressure data is detected and stored.

6. A method for determining a molding characteristic of an injection molding machine, comprising the steps of:

injecting a first resin having certain resin properties with a nozzle left open under a plurality of preset molding conditions, and detecting an injection pressure produced at that time by using a pressure sensor;

storing pressure data detected by the pressure sensor as reference pressure data, together with screw position data or time lapse data, in a storage device;

injecting a second resin, having at least one different resin property, with the nozzle left open under at least one of the plurality of molding conditions where the reference pressure data was obtained, and obtaining detected pressure data with respect to the screw position data or the time lapse data using the pressure sensor;

displaying the detected pressure data and the stored reference pressure data on a display; and determining a variation of the molding characteristic based on the displayed data.

7. The method for determining a molding characteristic according to claim 6, wherein said plurality of molding conditions include at least a temperature of the nozzle, a temperature of a cylinder and an injection speed.

8. The method for determining a molding characteristic according to claim 6, wherein the second resin has, as the at least one different resin property, at least one of differences of resin lot, drying temperature, mixing ratio of regenerant and age.

9. The method for determining a molding characteristic according to claim 6, wherein additional data including at least one of the molding conditions while obtaining the reference pressure data, date and a kind of the first resin, is simultaneously stored when the reference pressure data is detected and stored.

10. The method for determining a molding characteristic according to claim 6, where in the display and the storage device are associated with a personal computer, a controller of the injection molding machine is connected to the personal computer by a communication means, and said reference pressure data and detected pressure data are input in the personal computer to be displayed on the display.

11. The method for determining a molding characteristic according to claim 10, wherein additional data including at least one of a code for identifying the molding machine, the molding conditions while obtaining the data, date, and a kind of the first resin, is simultaneously stored when the reference pressure data is detected and stored.

12. A method for determining a molding characteristic of an injection molding machine, comprising the steps of:

injecting a first resin having certain resin properties with a nozzle left open under a plurality of preset molding conditions and detecting an injection pressure produced at that time using a pressure sensor;

storing a pressure data detected by the pressure sensor as reference pressure data, together with screw position data or time lapse data, in a storage device;

injecting a second resin, having at least one different resin property, with the nozzle left open under an optional molding condition to obtain detected pressure data with respect to the screw position data or the time lapse data using the pressure sensor;

finding interpolated reference pressure data with respect to said optional molding condition by interpolating from the reference pressure data stored in the storage device;

displaying the interpolated reference pressure data and the detected pressure data on a display; and determining a variation of the molding characteristic based on the displayed data.

13. The method for determining a molding characteristic according to claim 12, wherein the plurality of molding conditions includes at least a temperature of the nozzle, a temperature of a cylinder, and an injection speed.

14. The method for determining a molding characteristic according to claim 12, wherein the second resin has, as the at least one different resin property, at least one of differences of resin lot, drying temperature, mixing ratio of regenerant and age.

15. The method for determining a molding characteristic according to claim 12, wherein additional data including at least one of the molding conditions while obtaining the reference pressure data, date, and a kind of the first resin, is simultaneously stored when the reference pressure data is detected and stored.

16. The method for determining a molding characteristic according to claim 12, wherein the display and the storage device are associated with a personal computer, a controller of the injection molding machine is connected to the personal computer by a communication means, and said reference pressure data and detected pressure data are input in the personal computer to be displayed on the display.

17. The method for determining a molding characteristic according to claim 16, wherein additional data including at least one of a code for identifying the molding machine, the molding conditions while obtaining the data, date, and a kind of the first and second resin, are simultaneously stored when the reference pressure data is detected and stored.

18. A method for determining a molding characteristic of a injection molding machine, comprising the steps of:

injecting a first resin having certain resin properties with a nozzle left open under each of a plurality of preset molding conditions, and detecting an injection pressure produced at that time using a pressure sensor;

storing pressure data detected by the pressure sensor as reference pressure data, together with screw position data or time lapse data, in a storage device;

injecting a second resin, having at least one different resin property with the nozzle left open under at least one of the plurality of molding conditions and obtaining detected pressure data with respect to the screw position data or the time lapse data using the pressure sensor;

displaying the detected pressure data and the stored reference pressure data on a display; and determining a variation of the molding characteristic based on the displayed data.

19. The method for determining a molding characteristic according to claim 18, wherein the plurality of molding conditions includes at least a temperature of the nozzle, a temperature of a cylinder, and an injection speed.

20. The method for determining a molding characteristic according to claim 18, wherein the second resin has, as the at least one different resin property, at least one of differences of resin lot, drying temperature, mixing ratio of regenerant and age.

21. The method for determining a molding characteristic according to claim 18, wherein additional data including at least one of the molding conditions while obtaining the reference pressure data, date, and a kind of the first resin, is simultaneously stored when the reference pressure data is detected and stored.

22. The method for determining a molding characteristic according to claim 18, wherein the display and the storage device are associated with a personal computer, a controller of the injection molding machine is connected to the personal computer by a communication means, and said reference pressure data and detected pressure data are input in the personal computer to be displayed on the display.

23. The method for determining a molding characteristic according to claim 22, wherein additional data including at least one of a code for identifying the injection molding machine, the molding conditions while obtaining the reference pressure data, date, and a kind of the first resin, are simultaneously stored when the reference pressure data is detected and stored.

24. An injection molding machine, comprising:

a pressure sensor for detecting an injection pressure;

a storage device that stores pressure data detected by said pressure sensor when a first resin having certain resin properties is injected under molding conditions scheduled in advance with a nozzle in the injection molding machine left open, in connection with at least one of screw position or a time elapsed, as reference pressure data; and a comparator that outputs an alarm when detected pressure data with respect to screw position or time elapsed, obtained by injecting a second resin, having at least one different resin property with the nozzle left open, under the same molding conditions as that used in the injection of the first resin with the nozzle left open, exceeds a set monitoring width of the reference pressure data.

25. The injection molding machine according to claim 24, wherein the second resin, has, as the at least one different resin property, at least one of differences of resin lot, drying temperature, mixing ratio of regenerant and age.

26. The injection molding machine according to claim 24, wherein additional data including at least one of the molding conditions while obtaining the reference pressure data, date, and a kind of the first resin, are stored when the reference pressure data is detected and stored.

27. The injection molding machine according to claim 24, wherein the display and the storage device are associated with a personal computer, a controller of the injection molding machine is connected to the personal computer by a communication pathway, and said reference pressure data and detected pressure data are input in the personal computer to be displayed on the display.

28. The injection molding machine according to claim 27, wherein additional data, including at least one of a code for identifying the injection molding machine, the molding conditions while obtaining the reference pressure data, date, and a kind of the first resin, are simultaneously stored when the reference pressure is detected and stored.

* * * * *